(12) United States Patent
Wahl et al.

(10) Patent No.: US 8,601,564 B2
(45) Date of Patent: Dec. 3, 2013

(54) ATTACK PROTECTION FOR A PACKET-BASED NETWORK

(75) Inventors: Stefan Wahl, Schwieberdingen (DE);
Peter Domschitz, Stuttgart (DE);
Juergen Sienel, Leonberg (DE);
Bernhard Noe, Korntal-Muenchingen (DE)

(73) Assignee: Alcatel Lucent, Paris (FR)

( * ) Notice: Subject to any disclaimer, the term of this patent is extended or adjusted under 35 U.S.C. 154(b) by 562 days.

(21) Appl. No.: 12/387,121

(22) Filed: Apr. 28, 2009

(65) Prior Publication Data
US 2009/0265778 A1 Oct. 22, 2009

(30) Foreign Application Priority Data
Apr. 22, 2008 (EP) .................................. 08290395

(51) Int. Cl.
*H04L 29/06* (2006.01)

(52) U.S. Cl.
USPC ............................................. 726/11; 726/22

(58) Field of Classification Search
USPC ............................................. 726/11–13, 22
See application file for complete search history.

(56) References Cited

U.S. PATENT DOCUMENTS

| | | | |
|---|---|---|---|
| 7,444,679 B2 * | 10/2008 | Tarquini et al. | 726/25 |
| 7,603,716 B2 * | 10/2009 | Frank et al. | 726/25 |
| 8,065,722 B2 * | 11/2011 | Barford et al. | 726/14 |
| 8,141,156 B1 * | 3/2012 | Mao et al. | 726/23 |
| 2007/0121596 A1 * | 5/2007 | Kurapati et al. | 370/356 |
| 2009/0265456 A1 * | 10/2009 | Bouvier et al. | 709/224 |

OTHER PUBLICATIONS

Ke Zhang 2007 ProQuell llc. Instability Security and anomaly deection on Border Gateway Protocol pp. 1-107.*
V. Apte, Y.S. Wu, S. Bagchi, S. Garg, N. Singh; Spacedive: A Distributed Intrusion Detection System for Voice-Over-IP Enviornments; CERIAS Tech Report 2006-17; Center for Education and Research in Information Assurance and Security, Purdue University, West Lafayette, IN 47907-2086.

* cited by examiner

*Primary Examiner* — Kambiz Zand
*Assistant Examiner* — Ghodrat Jamshidi
(74) *Attorney, Agent, or Firm* — Carmen Patti Law Group, LLC (57) ABSTRACT

The invention relates to a protection unit for protecting a packet-based network from attacks, comprising: a signature analyzer for analyzing a packet stream received in a security border node of the packet-based network and for detecting attacks by comparing signatures of the packet stream with a set of signatures of previously identified attacks, an anomaly detector for detecting anomalies in the packet stream, and a signature interference unit for updating the set of signatures when anomalies in the packet stream are detected, the updated set of signatures being subsequently used for performing the signature analysis. A distribution unit distributes at least one signature of the updated set of signatures to at least one further security border node of the packet-based network. The invention also relates to a security border node comprising such a protection unit, a network comprising at least two such protection units, and a corresponding protection method.

18 Claims, 7 Drawing Sheets

ATTACK PROTECTION FOR A PACKET-BASED NETWORK

BACKGROUND OF THE INVENTION

The invention is based on a priority application EP08290395.6 which is hereby incorporated by reference.

The invention relates to a method and to a protection unit for protecting a packet-based network from attacks, to a security border node for a packet-based network comprising such a protection unit, as well as to a packet-based network comprising at least two such protection units.

The invention is related to the protection of packet-based networks such as communication/computer networks, in particular core networks, against any kinds of attacks. A core network may be implemented using the TISPAN (Telecoms & Internet converged Services & Protocols for Advanced Networks), resp. next generation network (NGN) architecture with an IMS (IP multimedia subsystem) using application layer control (signalling) protocols such as the Session Initiation Protocol (SIP) for creating, modifying, and terminating sessions with one or more participants. In such a core network, attacks can occur on different layers (IP, transport, up to the application layer) and the attack strategy can vary. In particular, the application protocol stacks in the border nodes of a core network are highly jeopardized and therefore need a protection mechanism to achieve the requested high availability of the whole system, especially for well behaving users/devices. It is understood that the invention is not limited to NGN/IMS/TISPAN network with SIP signalling, but pertains to all types of IP networks, using other types of signalling protocols, e.g. SOAP (Simple Object Access Protocol).

A core network 1 of the type described above is shown in FIG. 1. The core network 1 has multiple (security) border nodes 2a to 2f for connecting the core network 1 to access networks 3 which are themselves connected to end user equipment 4. Some of the border nodes 2a to 2f may also be used to connect the core network 1 to other core networks (not shown). In the border nodes 2a to 2f, a security policy needs to be applied that immediately identifies valid from potentially dangerous traffic. Identified fraud traffic needs to be blocked (by providing an identifying sequence of data or another identifying signature pattern), also referred to as a signature in the following.

Current security solutions are either based on signature detection which is fast but not adaptive to new attack patterns or/and use classification based detection algorithms which are adaptive but cause high processing load. Moreover, security strategies are currently concentrated on a single, individual Session Border Controller (SBC) or security border node, respectively.

OBJECT OF THE INVENTION

It is the object of the invention to provide: a method and a protection unit for protecting a packet-based network from attacks, a security border node comprising such a protection unit, as well as a network comprising at least two such protection units, all of which allow to efficiently protect the packet-based network from attacks.

SUMMARY OF THE INVENTION

This object is achieved by a method as described above, comprising: performing a signature analysis on a packet stream received in a security border node of the network for detecting attacks by comparing signatures of the packet stream with a set of signatures of previously identified attacks, performing an anomaly detection, in particular a statistical analysis, on at least part of the packet stream for detecting anomalies in the packet stream, updating the set of signatures when anomalies in the packet stream are detected, the updated set of signatures being subsequently used for performing the signature analysis, and each of the signatures of the updated set of signatures is distributed to at least one further, preferably to each further security border node of the network.

The invention proposes to extend Firewall and Signature based protection logics with an anomaly detection, which may be implemented as a classification based statistical analysis, typically performing an analysis of blocks of the data stream (digital signal), or another type of granularity analysis, e.g. based on machine learning algorithms. Typically, a byte or multi-byte analyzer may be used for performing the statistical analysis in order to detect anomalies. The detected anomalies are then reported to a signature interference engine which derives a signature or detection logic update by transforming the classification results of the statistical analysis to a new set of signatures. In such a way, the processing burden for detecting new attacks can be shifted to the Firewall and signature detection such that processing load can be reduced.

After a or multiple new signatures and detection logic has/have passed some verification tests, the generated configuration file can be pushed onto the other security border nodes and will be applied to the security functions of the other security border nodes, thus automatically distributing newly derived attack blocking strategies among the security border nodes of the packet-based network.

In a highly preferred variant, the method further comprises: performing an anomaly detection on application layer control messages, in particular session initiation protocol, SIP, messages of the packet stream, the updating of the set of signatures taking the result of the anomaly detection into account. For those attacks which can only be detected at the application layer, the application layer control stack, in particular the SIP stack, may also have an interface to report any anomalies. These anomalies are also investigated in the signature interference engine to determine an appropriate signature, which allows to detect these messages in the first and very fast stages ("FW", "Signature") of the protection logic.

Preferably, the method further comprises: controlling the sensitivity of the signature analysis and/or of the anomaly detection using a security threshold for the detection of attacks and/or for the detection of anomalies, the security threshold being preferably adjusted in dependence of at least one characteristic of the attacks, in particular of a number of detected attacks per time unit. In particular, the threshold level for generating an attack indication which can be set by a suitable control software may be controlled based on the history and/or the current situation of the computer network.

In a preferred improvement of this variant, the statistical analysis is performed as a parallel multi-sequence byte analysis, the weights of the byte sequence analysis being controlled in dependence of the security threshold by a security instance on the basis of the current attack situation. A statistical analysis in form of a byte analysis is performed on so-called n-grams, i.e. sequences of n items (typically bytes) of a given sequence (typically a string), using a sliding window being shifted only one byte during each cycle of the analysis. In a parallel multi-sequence byte analysis, a plurality of parallel analyzers is used which perform an analysis of n-grams of different sizes, e.g. unigrams (size 1), bigrams (size 2), etc.

The results of the analyses of the parallel analyzers are provided to a decider which weighs the results in dependence of the security threshold.

The method described above may preferably be implemented in a computer program product comprising code means for performing the steps described above. In particular, the method may be implemented as software or in a suitable hardware component (ASIC etc.).

A second aspect of the invention is implemented in a protection unit for protecting a packet-based network from attacks, comprising: a signature analyzer for analyzing a packet stream received in a security border node of the network and for detecting attacks by comparing signatures of the packet stream with a set of signatures of previously identified attacks, an anomaly detector, in particular a statistical analyzer, for detecting anomalies in the packet stream, a signature interference unit for updating the set of signatures when anomalies in the packet stream are detected, the updated set of signatures being subsequently used by the signature analyzer for performing the signature analysis, and a distribution unit for distributing at least one signature of the updated set of signatures to at least one further, preferably to each further security border node of the network.

Dedicated signatures may have a time to live indication which allows to restrict the signature file size. The signature interference unit may store the information tuple of the attack report from the byte analysis and the corresponding signature to be able to immediately update the protection logic. In such a way, signatures for protecting the network against attacks which were detected at one or a limited number of network ports of the packet-based network are distributed fast to all network ports, thus improving performance and quality of protection across multiple nodes. In particular, it may also be possible to install a data base for detected signatures in a global network such as the Internet, the data base being accessible by a plurality of network providers, such that a new signature may also be distributed to security border nodes of networks being operated by other providers. It is understood that the detection of two or more anomalies having a close temporal correlation and are also correlated in their contents may make the updating of the set of signatures more reliable.

In a highly preferred embodiment, the protection unit further comprises: a signaling stack, preferably a SIP stack, for performing an anomaly detection on application layer control messages, in particular on SIP messages, contained in the packet stream, the updating of the set of signatures in the signature interference unit taking the result of the anomaly detection into account. Thus, also those attacks which can only be detected at the application layer can be taken into account for updating the set of signatures.

In another highly preferred embodiment, the protection unit further comprises: a control unit for controlling the sensitivity of the signature analyzer and/or of the anomaly detector using a security threshold for the detection of attacks and/or for the detection of anomalies, the security threshold being preferably adjusted in dependence of at least one characteristic of the attacks, in particular on the number of the attacks detected during a pre-defined time interval. In such a way, the security sensitivity may be controlled based on the attack history and the current situation regarding the attacks. A further characteristic of the attacks may be the damage a particular type of attack may cause to the network, the security level being increased when one or more particularly dangerous attacks have been detected.

In a further preferred embodiment the statistical analyzer is a parallel multi-sequence byte analyzer, the weights of the byte sequence analysis being controlled in dependence of the security threshold. Typically, the analysis results of the n-grams having a larger size are provided with a higher weight as compared to the analysis results of n-grams having a smaller size in order to reduce false alarms.

In another highly preferred embodiment, the protection unit further comprises: a secured signalling stack, in particular a secured SIP stack, for processing application layer control messages contained in the data stream, a decision about the messages which have to be processed in the secured signalling stack being preferably made in dependence of the security threshold. To prevent service failure in case of a detected anomaly, the security border node may dispatch abnormal messages, typically SIP messages, to a low-priority SIP-stack which is secured in a so-called "sandbox" environment. The processing in the secured SIP stack is usually not performed at the line speed, such that sufficient time for a thorough check if the SIP message contains any recognizable attack is provided.

In another advantageous embodiment, the protection unit further comprises: a decision unit for making a decision about the messages, in particular about the SIP messages contained in the data stream for which the anomaly detection has to be performed, and a session queuing unit for queuing up the messages for which the anomaly detection is performed, the queued-up messages being preferably either dropped or processed in dependence of the result of the anomaly detection. The decision unit decides if the messages have to be additionally analyzed with the anomaly detector or if relying on the signature analysis is sufficient. Inputs to the decision unit may be the type of message (request/response), the SIP method, the network ID of the network from which the message originated, SIP headers like the Call ID, a feedback from the SIP stack about one or more of the previous SIP messages or methods, or the transaction ID.

In a further embodiment, the protection unit further comprises a pinhole for dropping messages from the data stream, the pinhole being controlled in a feedback loop by the statistical analyzer and/or by the signature analyzer. The pinhole allows to filter out messages/packets identified by a dedicated 5-tuple, the amount of filtered traffic being dependent on the security threshold which is applied by the statistical analyzer and/or the signature analyzer.

A third aspect of the invention is implemented in a security border node for a packet-based network, comprising a protection unit of the type described above. The detection algorithms executed in multiple distributed security/border nodes can distribute machine learning information or flow oriented patterns in order to enhance the overall detection precision, thus implementing a cross-node correlation of security information. One way of implementing such a cross-node correlation is a peer-to-peer information exchange between the security border nodes, being possible when each security border node comprises its own protection unit.

A fourth aspect of the invention is implemented in a packet-based network comprising at least two protection units of the type described above, the protection units having a common signature interference unit which is preferably arranged in a centralized network security instance of the computer network. In such a way, the presented firewall architecture can be enhanced by the introduction of a cross operator domain security entity (network security instance). This master control entity allows to collect, process and redistribute the security-relevant information of multiple sites. Again, machine learning algorithms can be implemented to correlate all available information.

Further features and advantages are stated in the following description of exemplary embodiments, with reference to the figures of the drawing, which shows significant details, and are defined by the claims. The individual features can be implemented individually by themselves, or several of them can be implemented in any desired combination.

BRIEF DESCRIPTION OF THE DRAWINGS

Exemplary embodiments are shown in the diagrammatic drawing and are explained in the description below. The following are shown.

DETAILED DESCRIPTION OF PREFERRED EMBODIMENTS

Figure 1:
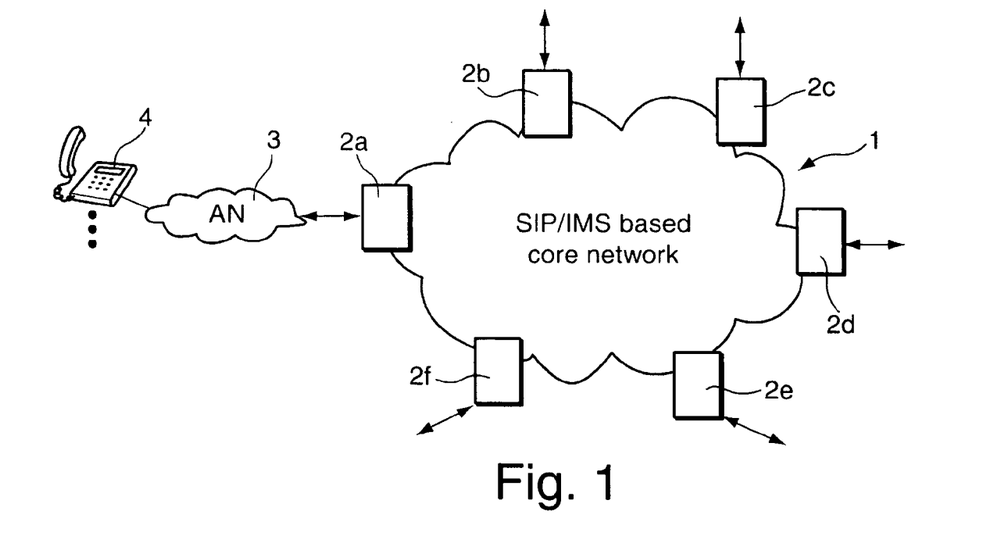
FIG. 1 a schematic diagram of an embodiment of a packet-based network according to the invention with several security border nodes, FIG. 2 an embodiment of a security border node according to the invention, serving as a protection unit with an adaptive distributed security-loop architecture, FIG. 3 an embodiment of a protection unit with a centralized signature interference unit and a security border node, together implementing an adaptive distributed security-loop architecture, FIG. 4 an embodiment of a security border node of the type shown in FIG. 2, with an additional application layer security loop, FIG. 5 an embodiment of a protection unit of the type shown in FIG. 3 with an additional application layer security loop, FIG. 6 a byte analyzer with an adjustable security threshold for deciding which messages contained in the packet stream are to be processed in a secured SIP stack, FIG. 7 a signature analyzer with an adjustable security threshold for deciding which messages contained in the packet stream are to be processed in a secured SIP stack, 331 FIGS. 8a,b a byte sequence analysis which is performed in the data path (a) or on selected messages out of the data path (b), FIG. 9 a parallel multi-byte sequence analyzer with adjustable weights of the byte sequence analysis, FIG. 10 feedback links between a byte analyzer, a signature analyzer, and a pinhole, FIG. 11 an embodiment of a protection unit implementing a multi-strategy security architecture, a byte analysis being performed in the signal path, and FIG. 12a further embodiment of a protection unit implementing a multi-strategy security architecture, a byte analysis being performed out of the signal path.
Figure 2:
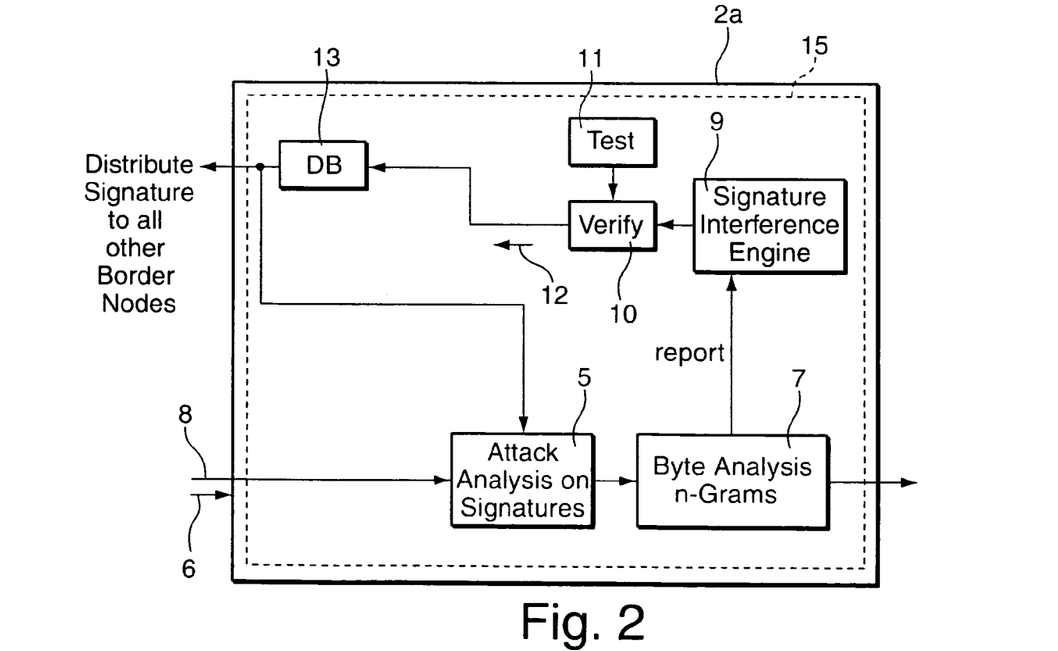

FIG. 2 is a more detailed view of the security border node 2a of the packet-based network 1 of FIG. 1. The security border node 2a comprises a signature analyzer 5 for analyzing a packet stream 6 received at an input to the security border node 2a. The signature analyzer 5 detects attacks by comparing signatures of the packet stream 6 with a set of signatures of previously identified attacks. Following the signature analyzer 5 in a signal path 8 of the packet stream 6 is an anomaly detector in the form of a statistical analyzer which is implemented as a byte analyzer 7. The byte analyzer 7 performs a statistical analysis of byte sequences of variable length (n-byte analysis) on the packet stream 6 for detecting anomalies in the packet stream 6.

Any anomaly is reported to a signature interference unit 9 which calculates a new signature set, taking the detected anomalies into account. The security border node 2a further comprises an automated verification unit 10 for testing a modified signature set against a set of correct and of attack test patterns (not shown) stored in a testing unit 11. After a successful verification, an updated set of signatures 12 is provided to the signature analyzer 5 which subsequently performs the signature analysis based on the updated set of signatures 12. In the way described above, a protection unit 15 is implemented in the security border node 2a.

The updated signature set 12 is also provided to a distribution unit 13 of the security border node 2a which distributes the updated signature set 12 to the other security border nodes 2b to 2f of the core network 1. As the distribution unit 13 of the security border node 2a may also receive updated sets of signatures from the other security border nodes 2b to 2f, the signature analyzer 5 is capable to identify any kind of attack which was previously identified within the security border node 2a itself or in any one of the further security border nodes 2b to 2f. In such a way, all the security border nodes 2a to 2f are part of a distributed adaptive security loop which is based on a peer-to-peer information exchange.

As both the signature analyzer 5 and the byte analyzer 7 are arranged in the signal path 8, the signature based attack analysis can be performed at line speed/realtime. Thus, the above methodology autonomously analyzes the attacks at each security border node 2a to 2f and each ingress port, updates the signature set and thus hardens all other security border nodes 2a to 2f against attacks.

Figure 3:
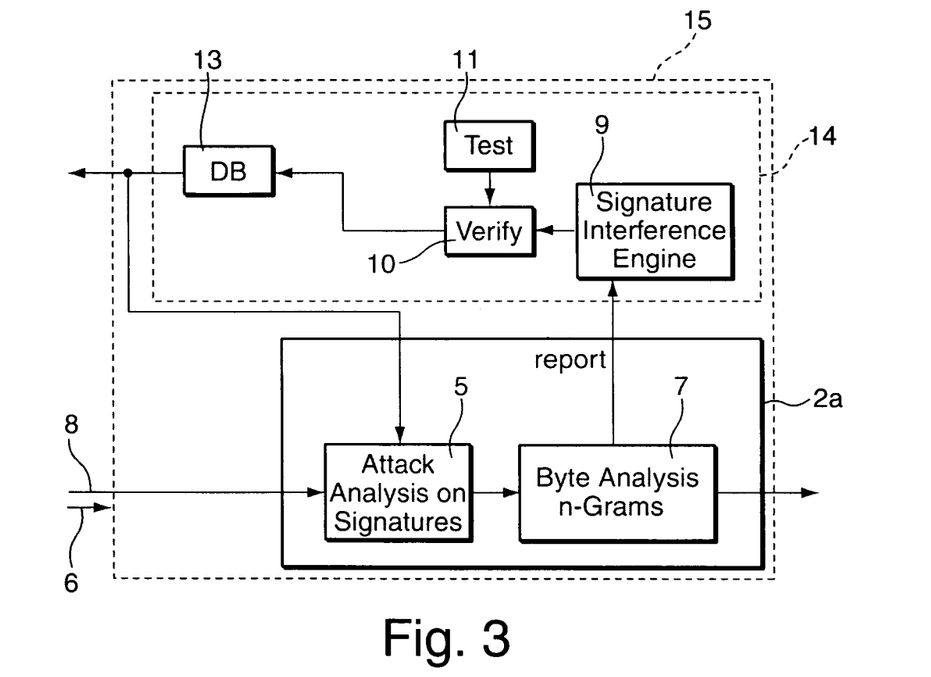

A variant of the architecture of FIG. 2 is shown in FIG. 3, in which the signature interference unit 9, the verification unit 10, the testing unit 11, and the distribution unit 13 are arranged in a central network security instance 14. Thus, a distributed protection unit 15 for protecting the core network 1 of FIG. 1 is formed by the network security instance 14, the signature analyzer 5, and the byte analyzer 7 of the security border node 2a. It will be understood that not only the security border node 2a, but also the other security border nodes 2b to 2f report the results of their byte analysis to the central signature interference unit 9. By performing the updating of signatures at a single location of the network 1, the consistency of the signatures can be easier guaranteed and less resources are required.

The above-described strategy can also be extended across border node domains. This means that all applied border nodes (world-wide) may send their reports to an upper hierarchy level, so that a worldwide, cross-product and possibly cross-provider signature interference unit may produce a new signature set which will then be downloaded into all security border nodes or products of a specific company which apply a signature analysis. A realization variant would be to apply the signature interference unit in each domain or product and, if a new signature is derived, this signature is distributed worldwide.

Figure 4:
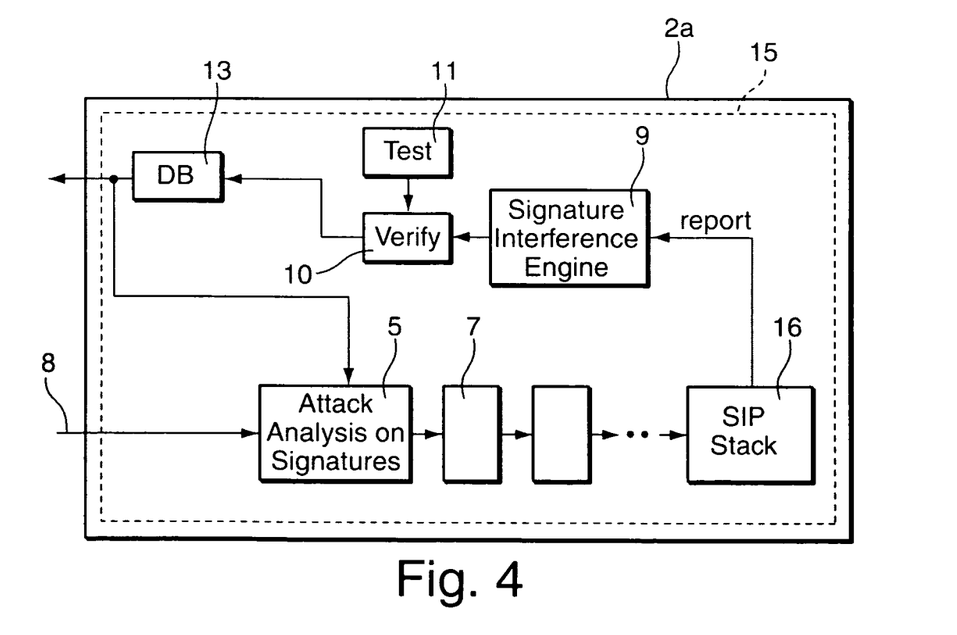
Figure 5:
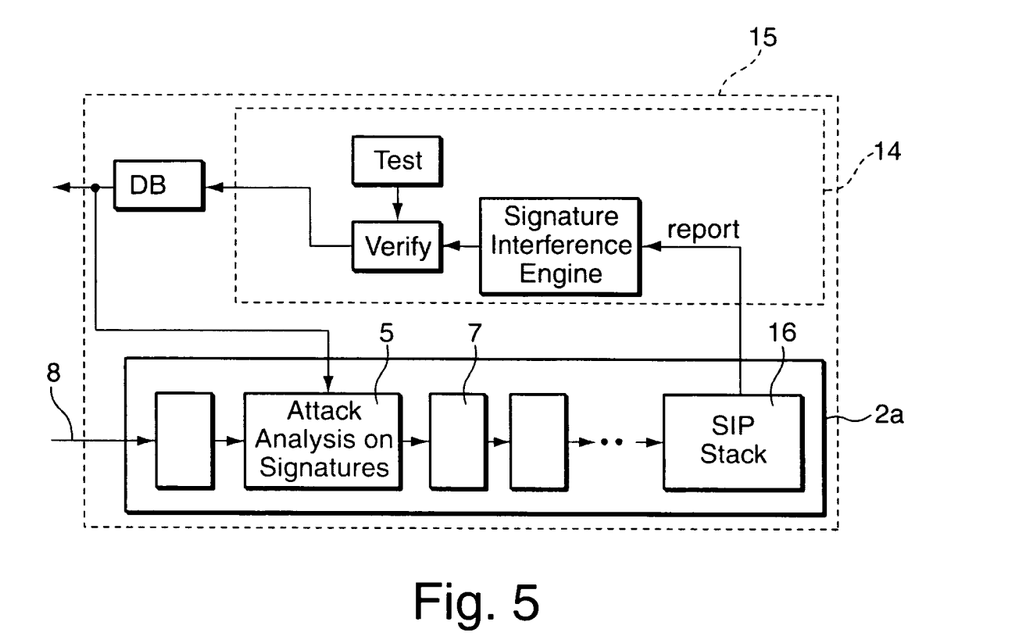

The implementation of a further feedback loop in the protection unit 14 of the security border node 2a and in the distributed protection unit 14, respectively, are shown in FIGS. 4 and 5. The second feedback loop is based on an application layer analysis of the SIP messages contained in the data stream 6 which is performed in a SIP stack 16. This second loop is designed for those first appearing attacks which cannot be identified by the byte analyzer 7, but only through application layer processing. The SIP stack 16 reports characteristic (non semantic) content of the SIP message to the signature interference unit 9, which then generates a new signature set in the way described above. This means that if the SIP stack 16 identifies a semantically incorrect SIP message whose incorrectness can only be revealed in the contents between multiple header fields. After the SIP stack 16 has found these inconsistencies, it generates a report which contains the relevant header contents and sends the report to the signature interference unit 9.

Two architecture variants of the protection unit 15 with the additional feedback loop are represented in FIGS. 4 and 5. In the first one, the protection unit 15 is implemented in a security border node 2a, in the second one, the protection unit 15 is a distributed one, having a centralized network security instance 14 (compare also FIGS. 2 and 3). In both variants, the procedure for identifying attacks on the application layer level is as follows: The first appearance of the attack will not be identified by the signature analyzer 5 or byte analyzer 7, respectively. The semantic processing at the SIP application level in the SIP stack 16 then identifies the attack, extracts a part from the SIP message and reports this sequence (and possibly further layer 3/layer 4 information) to the signature interference unit 9. In such a way, after the signature set is updated, a second similar message attack will be detected by the signature analysis unit 5.

In the examples shown in FIGS. 2 to 5, the signature analyzer 5 and the byte analyzer 7 may both be provided with an adjustable security threshold 17a which is set by a control unit 17 (see FIGS. 6 and 7) for controlling the sensitivity of the byte analysis and/or of the signature analysis. The control unit 17 may be implemented as a control software which controls the adjustable threshold in dependence of the amount of attacks and/or the characteristics of the attacks, e.g. the type of attacks. For this purpose, the control unit 17 collects information contained in the reports of the signature analyzer 5, the byte analyzer 7, and the SIP stack 16, respectively. The control unit 17 may either be implemented in the security border node 2a and may then control the security level only in dependence of the data stream 6 received by the security border node 2a, or the control unit 17 may be part of the centralized network security instance 14, thus taking the reports from different security border nodes 2a to 2f for the adjustment of the security threshold into account. In any case, the threshold level for generating an attack indication can be controlled based on the history and the current attack situation.

Figure 6:
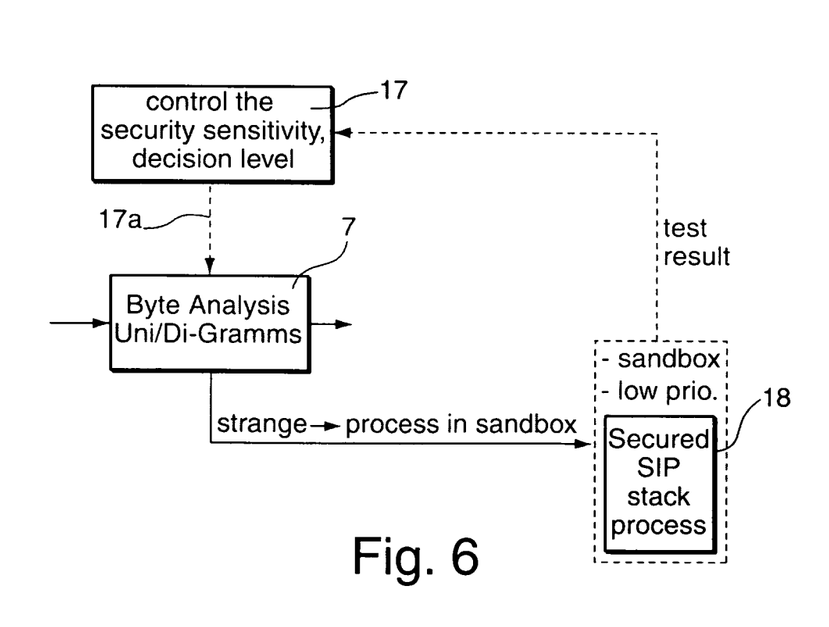
Figure 7:
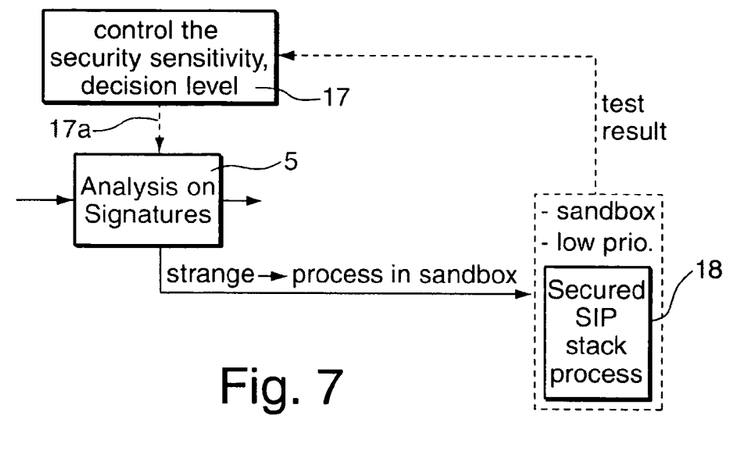

Furthermore, as is shown in FIGS. 6 and 7 for the byte analyzer 7 and the signature analyzer 5, respectively, if the threshold is exceeded, a SIP message may not be processed as usual but may be forwarded to a secured SIP stack 18 which is executed within a 'sandbox' environment with low processing priority. If the SIP message does not contain any recognizable attack, the secured SIP stack 18 processes the message as any other well-behaving message. The processing feedback (positive/negative) of the secured SIP stack 18 may then be reported e.g. to the control unit 17 which can then decide to modify the security sensitivity decision level for adapting the security threshold.

Figure 8A:
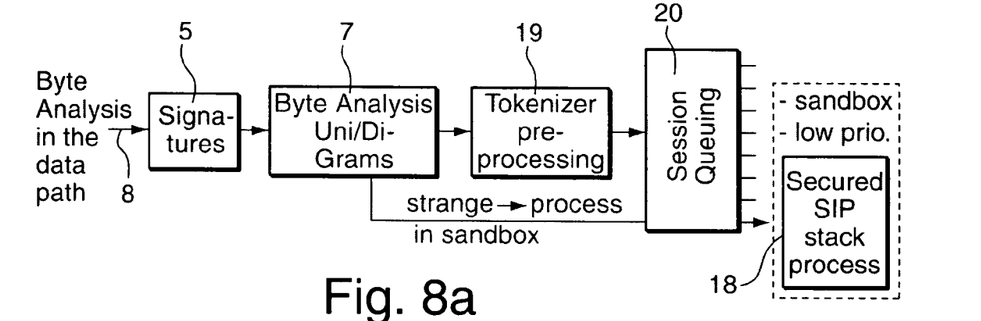
Figure 8B:
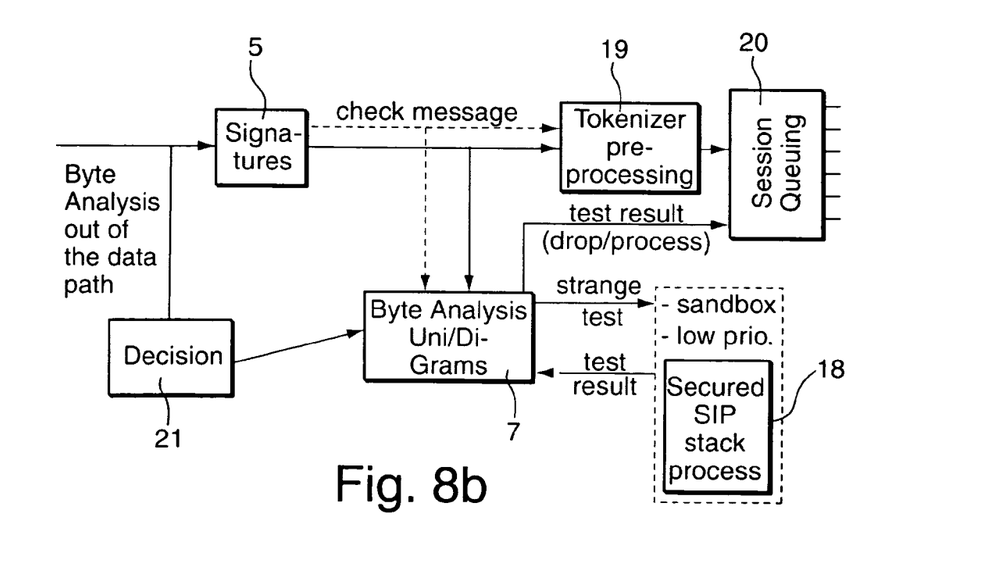

In FIGS. 8a and 8b, two alternative ways of performing the byte analysis are shown. In the first alternative represented in FIG. 8a, the byte analyzer 7 is provided as an in-line element in the data path 8, the data path 8 additionally comprising a tokenizer 19 and a session queuing unit 20. In this case, the processing effort and processing performance requirements are high, as the throughput shall not be reduced by the byte analysis. Thus, the chain of signature analyzer 5, byte analyzer 7 and tokenizer 19 must be capable to run at maximum expected message rate. The byte analyzer 7 can indicate 'strange' messages and instructs the session queuing unit 20 to send these messages to the Secured SIP Stack 18 which is running in sandbox. If the secured SIP stack 18 identifies attacks or even crashes, the messages of this session are filtered out and the session queue is closed. Optionally, another SIP stack (not shown) is triggered to send a message to the registrar or S-CSCF (Serving Call Session Control Function) to close the session or the client in a regular way.

In the example shown in FIG. 8b, the byte analyzer 7 is arranged out of the message path 8 and the byte analysis is only applied if a further decision unit 21 gives a positive result, so that in dependence of the results of the decision unit 21, the byte analyzer 7 will only analyze specific SIP messages. These SIP messages are marked so that the session queuing unit 20 knows that it has to queue these messages until further investigations have been performed. The byte analyzer 7 can also decide to perform a further analysis of the messages in the secured SIP stack 18. In any case, the test result is provided to the session queuing unit 20, the test result indicating to either drop or process the message processed by the byte analyzer 7. In case that the byte analyzer 7 indicates that the message should be processed, processing will be performed as with any other uncritical message. The advantage of this solution is that the total processing effort is reduced and the throughput increases, but the success of this solution depends on the quality of the signature analysis and the adjustable security threshold, as in case that the decision unit 21 is part of the signature analyzer 5, the security threshold can be taken into account for the decision. Inputs to the decision unit 21 may also include the type of message (request/response), the SIP method, the network ID of the network that sent the message, SIP headers like the Call ID, a feedback from the SIP stack about one or more of the previous SIP messages or methods, or the transaction ID.

Figure 9:
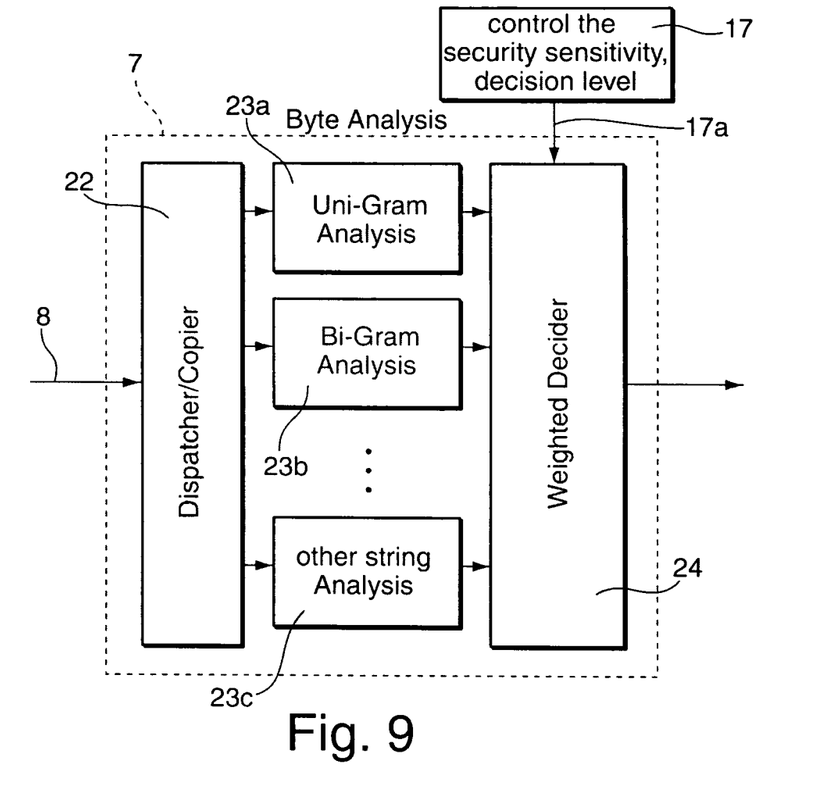

FIG. 9 shows how the security threshold 17a may be advantageously used in a byte analyzer 7 which is implemented as a parallel multi-byte sequence analyzer, having a dispatching/copying unit 22, a number of string analyzing units for analyzing strings having different lengths, three of the string analyzing units 23a to 23c being represented in FIG. 9, and a weighted decider 24 for weighing the results of the string analyzing units 23a to 23c in dependence of the security threshold 17a which is provided to the byte analyzer 5 by the control unit 17, thus adapting the byte analysis on the basis of the current attack situation.

Figure 10:
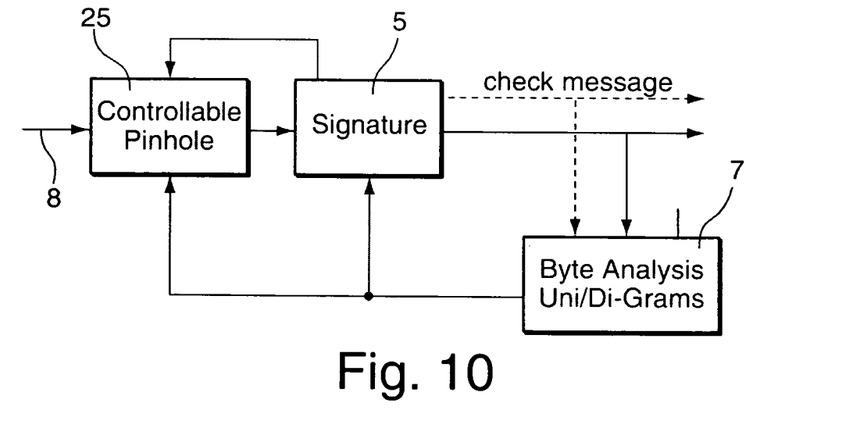

In any of the examples shown in FIGS. 2 to 8, a feedback between the byte analyzer 7, the signature analyzer 5, and a pinhole 25 may be performed, for example in the way shown in FIG. 10: The signature analyzer 5 controls the pinhole block 25 to filter out messages which have been received from a dedicated 5-tuple, the signature analyzer 5 only performing this dedicated blocking if a certain security threshold (not shown) of the signature analysis is exceeded. In case that the signature analyzer 5 and the byte sequence analyzer 7 both indicate permanent misbehaving messages, the pinhole module 25 can be controlled to close the pinhole (for a given time).

Similar feedback exists also from the byte analyzer 7 to the preceding function modules. The feedback to the signature analyzer 5 is a kind of falsification or verification of the "check message" request from the signature analyzer 5. This allows to increase or reduce the threshold for dedicated sessions, and the signature analyzer 5 may be used as a decision unit in this case. If, for example, several message check requests to the byte analyzer 7 for the same session always produce the result "no attack identified", the signature analyzer 5 may increase the threshold for performing additional checks for this session.

Figure 11:
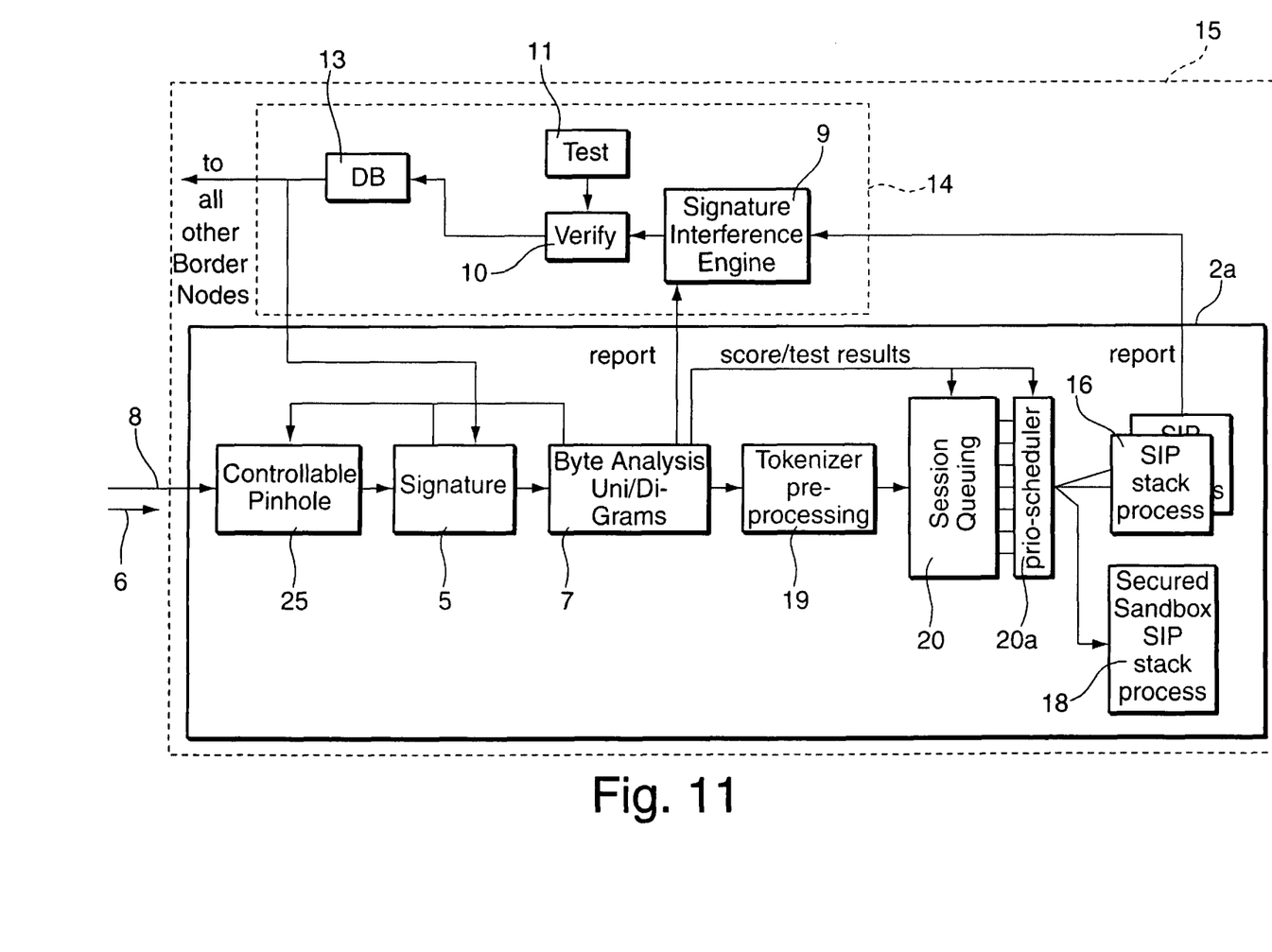
Figure 12:
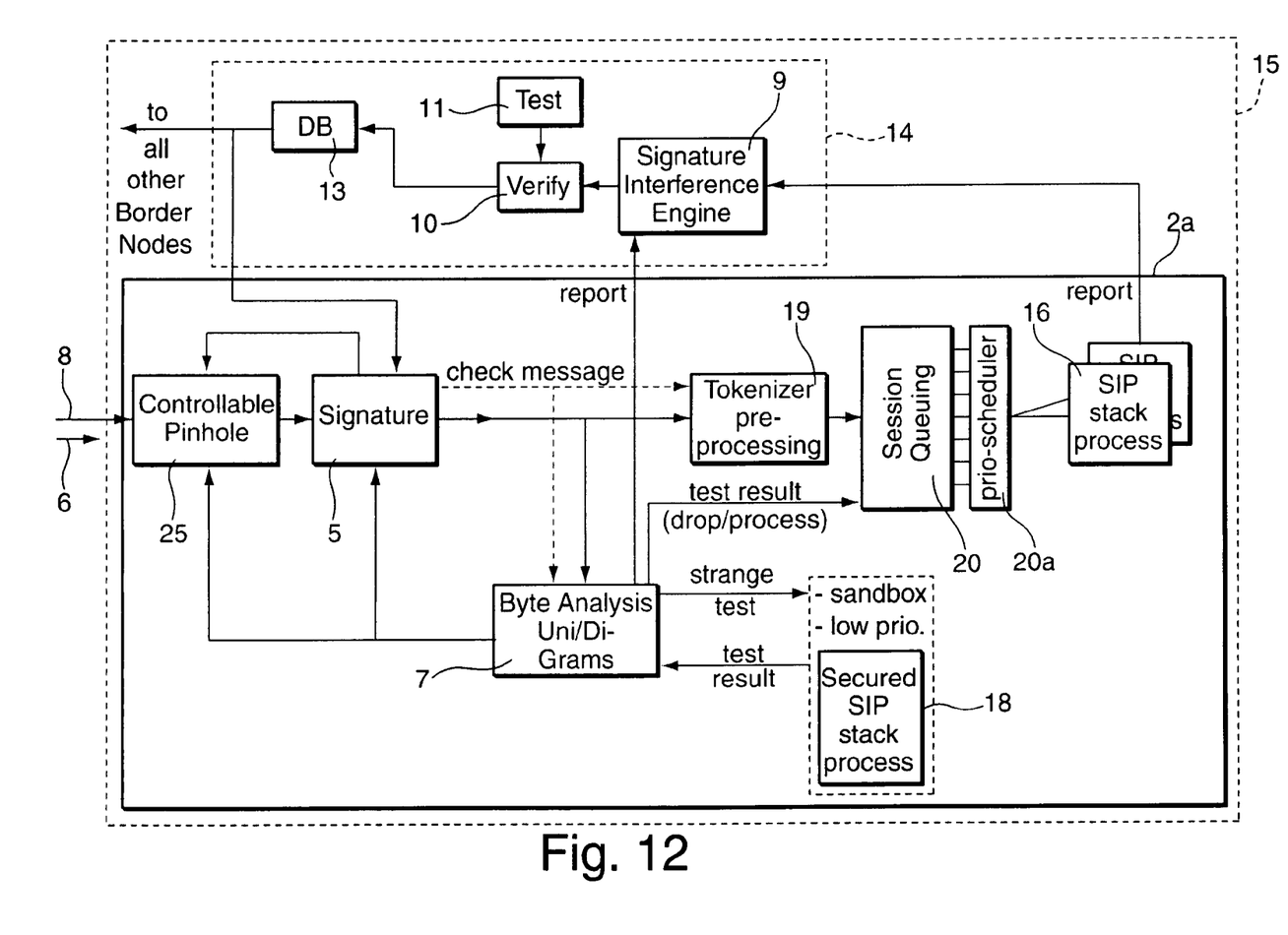

Finally, in FIGS. 11 and 12, the building blocks described in FIG. 2 to FIG. 10 are combined to form two advantageous examples of a protection unit 14 implementing a cross-layer and multi-strategy security architecture.

In the example shown in FIG. 11, the byte analysis is performed in the data path 8 in the way described with respect to FIG. 8a, the session queuing unit 20 comprising a priority scheduler 20a which attributes a low priority to SIP messages which have been qualified as "strange" and are sent to the secured SIP stack 18 for processing. SIP messages which have not been qualified as "strange" by the byte analyzer 7 are sent to unprotected SIP stacks 16 and are processed with higher priorities.

In the exemplary embodiment of FIG. 12, the byte analyzer 7 is arranged out of the data path 8 and the signature analyzer 5 comprises a decision unit (not shown) for deciding which of the SIP messages contained in the data stream 6 are to be checked by the byte analyzer 7. In this case, the session queuing unit 20 queues up the SIP messages for which the byte analysis is performed, and the queued-up messages are either dropped or processed in dependence of the result of the byte analysis, as has been discussed in greater detail with reference to FIG. 8b.

In both cases, the security thresholds of the signature analyzer 5 and the byte analyzer 7 may be controlled by a control unit which is not shown in FIGS. 11 and 12 for the sake of simplicity.

The person skilled in the art will appreciate that the functional blocks of FIGS. 11 and 12 need not to be located locally at the security border node 2a as shown in FIGS. 11 and 12, as it may be advantageous to place the full line speed processing modules at the ingress ports of the security border node. In particular, the tokenizer 19, the session queuing unit 20, the priority scheduler 20a and especially the SIP stacks 16 and secured SIP stacks 18 may be placed more centrally (in the security border node) or even in a centralized network element such as the centralized network security instance 14. Furthermore, it will be understood that instead of using the distributed architecture of the protection unit 15 shown in FIGS. 11 and 12, it is also possible to integrate the whole protection unit 15 in the security border node 2a, as described with reference to FIGS. 2 and 4.

In summary, by providing a protection unit of the kind described above, it is possible to efficiently protect a computer network against network attacks which are detected at one or a limited number of core network ports, and to perform a fast distribution of the signatures to other network ports. It will be understood that the protection unit is not necessarily implemented in a security border node of the network, as in some cases the implementation of protection units at certain nodes inside of the network may also be of advantage. Finally, the person skilled in the art will appreciate that although in the above examples, the processing of SIP messages has been described, the concepts described above may be applied to other types of application layer control messages used for the signaling of the application layer. Also, although the anomaly detection has been described above with reference to a byte analysis, it will be understood that other ways of performing an anomaly detection exist, either being based on other types of statistical analysis or on other anomaly detection methods such as machine learning, etc.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

The invention claimed is:

1. A method for protecting a packet-based network from attacks, comprising the steps of:
    performing a signature analysis on a packet stream received in a security border node of the packet-based network to detect attacks by comparing signatures of the packet stream with a set of signatures of previously identified attacks;
    performing, by the security border node, an anomaly detection on at least part of the packet stream to detect anomalies in the packet stream;
    updating, by the security border node, the set of signatures when the anomalies in the packet stream are detected, the updated set of signatures being subsequently used to perform the signature analysis;
    distributing, by the security border node, at least one signature of the updated set of signatures to at least one further security border node of the packet-based network; and
    performing, by the security border node, an anomaly detection by semantic processing on application layer control messages of the packet stream to identify semantically incorrect application layer control messages, and updating the set of signatures based on the identified semantically incorrect application layer control messages.

2. The method according to claim 1, further comprising the step of:
    controlling the sensitivity of the signature analysis and/or of the anomaly detection using a security threshold for the detection of attacks and/or for the detection of the anomalies, the security threshold being adjusted in dependence of at least one characteristic of the attacks.

3. The method according to claim 2, wherein the anomaly detection is performed as a parallel multi-sequence byte analysis, and wherein weights of a byte sequence analysis are controlled in dependence of the security threshold.

4. A protection unit for protecting a packet-based network from attacks, comprising:
    a signature analyzer configured to analyze a packet stream received in a security border node of the packet-based network and to detect attacks via a comparison of signatures of the packet stream with a set of signatures of previously identified attacks;
    an anomaly detector configured to detect anomalies in the packet stream;
    a signature interference unit configured to update the set of signatures when the anomalies in the packet stream are detected, the updated set of signatures being subsequently used by the signature analyzer to perform the signature analysis;
    a distribution unit configured to distribute at least one signature of the updated set of signatures to at least one further security border node of the packet-based network; and
    a session initiation protocol (SIP) stack configured to perform an anomaly detection by semantic processing on SIP messages contained in the packet stream, the updated set of signatures in the signature interference unit being based on the identified semantically incorrect SIP messages.

5. The protection unit according to claim 4, further comprising:
    a control unit configured to control the sensitivity of the signature analyzer and/or of the anomaly detector using a security threshold for the detection of attacks and/or for the detection of the anomalies, the security threshold being adjusted in dependence of at least one characteristic of the attacks.

6. The protection unit according to claim 5, wherein the anomaly detector is a parallel multi-sequence byte analyzer, wherein weights of a byte sequence analysis are controlled in dependence of the security threshold.

7. The protection unit according to claim 5, further comprising:
a secured SIP stack to process application layer control messages contained in the data stream, a decision about the application layer control messages which have to be processed in the secured signalling stack being made in dependence of the security threshold.

8. The protection unit according to claim 4, further comprising:
a decision unit configured to make a decision about the SIP messages contained in the data stream for which the anomaly detection has to be performed; and
a session queuing unit configured to queue up the messages for which the anomaly detection is performed, the queued-up messages being either dropped or processed in dependence of the result of the anomaly detection.

9. The protection unit according to claim 4, further comprising:
a pinhole to drop messages from the data stream, the pinhole being controlled in a feedback loop by the anomaly detector and/or by the signature analyzer.

10. A security border node for a packet-based network, comprising:
a protection unit according to claim 4.

11. A packet-based network, comprising:
at least two protection units according to claim 4, the protection units having a common signature interference unit which is arranged in a centralized network security instance of the packet-based network.

12. The method according to claim 1, wherein the anomaly detection is based on statistical analysis.

13. The method according to claim 1, wherein the anomaly detection is based on machine learning.

14. The protection unit according to claim 4, wherein the anomaly detector is a statistical analyzer.

15. The protection unit according to claim 5, wherein the at least one characteristic of the attacks is based on a number of the attacks.

16. The method according to claim 1, wherein the application layer control messages are session initiation protocol (SIP) messages.

17. The method according to claim 1, wherein the security border node is configured to receive updated sets of signatures from the at least one further security border nodes.

18. The method according to claim 1, wherein the distributed adaptive security loop is based on a peer-to-peer information exchange.

* * * * *